(12) United States Patent
Carnicke et al.

(10) Patent No.: US 11,029,224 B2
(45) Date of Patent: Jun. 8, 2021

(54) METHOD FOR THERMALLY CORRECTING DATA OBTAINED THROUGH STRAIN GAUGES MOUNTED TO A SURFACE

(71) Applicant: LOCKHEED MARTIN CORPORATION, Bethesda, MD (US)

(72) Inventors: Allen S. Carnicke, Bridgeport, CT (US); Elias John Ervin, Monroe, CT (US); Blerand Qeriqi, Southington, CT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 190 days.

(21) Appl. No.: 16/431,086

(22) Filed: Jun. 4, 2019

(65) Prior Publication Data
US 2020/0386633 A1    Dec. 10, 2020

(51) Int. Cl.
*G01L 1/00* (2006.01)
*G01L 1/22* (2006.01)
*B64C 27/04* (2006.01)

(52) U.S. Cl.
CPC .......... *G01L 1/2281* (2013.01); *G01L 1/2287* (2013.01); *B64C 27/04* (2013.01)

(58) Field of Classification Search
CPC ...... G01L 1/2281; G01L 1/2287; B64C 27/04
See application file for complete search history.

(56) References Cited

U.S. PATENT DOCUMENTS

| | | | |
|---|---|---|---|
| 3,665,756 A * | 5/1972 | Russell | G01L 1/2281 73/766 |
| 5,186,055 A | 2/1993 | Kovacich et al. | |
| 5,222,398 A | 6/1993 | O'Brien | |
| 5,354,015 A * | 10/1994 | Meador | B64D 15/20 244/134 F |
| 2003/0150276 A1* | 8/2003 | Christensen | G01L 1/2231 73/795 |
| 2004/0066188 A1* | 4/2004 | Goldfine | G01R 33/12 324/228 |

(Continued)

FOREIGN PATENT DOCUMENTS

GB    1333167 A    10/1973
GB    1335520 A    10/1973

*Primary Examiner* — Max H Noori
(74) *Attorney, Agent, or Firm* — Foley & Lardner LLP

(57) ABSTRACT

An instrumentation system for use with a component formed from a first material having non-uniform coefficients of thermal expansion includes a first sensing system configured to be mounted to the component to sense temperature and mechanical forces on the component, and a thermally compensating coupon configured to be mounted to the component adjacent the first sensing system. The thermally compensating coupon is formed from a second material having non-uniform coefficients of thermal expansion that are substantially identical to the non-uniform coefficients of thermal expansion of the first material. A thermally compensating sensing system is mounted to the thermally compensating coupon and connected to the first sensing system. The thermally compensating sensing system is isolated from mechanical forces perceived by the component while sensing temperatures on the component such that the connection of the thermally compensating sensing system to compensate for the temperature sensed by the first sensing system.

20 Claims, 6 Drawing Sheets

(56) References Cited

U.S. PATENT DOCUMENTS

| | | | |
|---|---|---|---|
| 2008/0223152 A1* | 9/2008 | Georgeson | G01M 5/0016 73/862.041 |
| 2009/0007687 A1* | 1/2009 | Arms | G01M 5/0083 73/786 |
| 2009/0145239 A1* | 6/2009 | Girshovich | G01B 7/16 73/779 |
| 2009/0255736 A1 | 10/2009 | Naito et al. | |
| 2017/0106585 A1* | 4/2017 | Nino | G01M 5/0083 |

* cited by examiner

METHOD FOR THERMALLY CORRECTING DATA OBTAINED THROUGH STRAIN GAUGES MOUNTED TO A SURFACE

STATEMENT OF FEDERAL SUPPORT

This invention was made with government support under contract number N00019-06-C-0081 awarded by The United States Navy. The government has certain rights in the invention.

BACKGROUND

The subject matter disclosed herein generally relates to mounting strain gauges to a surface of interest and, more particularly a method of mounting that promotes thermally correcting data obtained from strain gauges mounted to the surface of interest.

Strain gauges are mounted to surfaces to detect various physical parameters. For example, strain gauges may be employed to sense compression and/or tensile stresses in a component along one or more select axes. The orientation of the select axes may depend on an orientation of the strain gauge. Certain installations may be configured to detect compressive and/or tensile forces in multiple axes.

Often times, the strain gauge is employed to detect specific stresses/strains in a component. However, in addition to stresses/strains resulting from a physical input of interest; the strain gauge may also be affected by temperature related stresses and/or strains. Data post processing to remove temperature effects is difficult, resource and time intensive. Often times, the resulting data does not portray an entirely accurate picture of the actual stresses and strains. In addition, accurate data cannot be obtained in real time due to the need for significant post processing operations. The lack of real time data acquisition may have a negative impact on test plans.

BRIEF DESCRIPTION

According to an embodiment, a thermally compensating instrumentation system for use with a component to be measured formed from a first material having non-uniform coefficients of thermal expansion includes a first sensing system configured to be mounted to the component formed from the first material to sense temperature and mechanical forces on the component, and at least one thermally compensating coupon configured to be mounted to the component adjacent the first sensing system. The at least one thermally compensating coupon is formed from a second material having non-uniform coefficients of thermal expansion that are substantially identical to the non-uniform coefficients of thermal expansion of the first material. A thermally compensating sensing system is mounted to the at least one thermally compensating coupon and connected to the first sensing system. The thermally compensating sensing system is isolated from mechanical forces perceived by the component while sensing temperatures on the component such that the connection of the thermally compensating sensing system to the first sensing system compensates for the temperature sensed by the first sensing system.

In addition to one or more of the features described above, or as an alternative, in further embodiments the first sensing system includes a first portion mounted to the component and a second portion mounted opposite the first portion, the at least one thermally compensating coupon includes a first thermally compensating coupon mounted adjacent the first portion of the first sensing system and a second thermally compensating coupon mounted adjacent the second portion of the first sensing system.

In addition to one or more of the features described above, or as an alternative, in further embodiments the first portion of the first sensing system comprises a first strain gauge and a second strain gauge, and the second portion of the first sensing system comprises a third strain gauge and a fourth strain gauge connected to form a strain gauge bridge.

In addition to one or more of the features described above, or as an alternative, in further embodiments the thermally compensating sensing system includes a first plurality of strain gauges mounted to the first thermally compensating coupon and operatively connected to the strain gauge bridge.

In addition to one or more of the features described above, or as an alternative, in further embodiments the thermally compensating sensing system includes a second plurality of strain gauges mounted to the second thermally compensating coupon and operatively connected to the strain gauge bridge.

In addition to one or more of the features described above, or as an alternative, in further embodiments the first plurality of strain gauges includes a fifth strain gauge and a sixth strain gauge, and the second plurality of strain gauges includes a seventh strain gauge and an eighth strain gauge, the strain gauge bridge comprising an eighth gauge full bridge strain gauge system.

In addition to one or more of the features described above, or as an alternative, in further embodiments the at least one thermally compensating coupon is connected to the component with a mechanically isolating adhesive.

In addition to one or more of the features described above, or as an alternative, in further embodiments the mechanically isolating adhesive comprises one of a room temperature vulcanizing (RTV) cement and a rubber cement.

Also disclosed is a method of thermally correcting data obtained from strain gauges mounted to a surface including mounting a first strain gauge system to a surface of interest, the surface of interest comprising a first material having non-uniform coefficients of thermal expansion, forming a thermally compensating coupon having body including a first surface and an opposing second surface, the coupon comprising a second material having substantially the same non-uniform coefficients of thermal expansion as the first material, mounting a second strain gauge system to the first surface of the thermally compensating coupon, positioning the thermally compensating coupon on the surface of interest adjacent to the first strain gauge system such that the non-uniform coefficients of thermal expansion of the thermally compensating coupon substantially align with the non-uniform coefficients of thermal expansion of the first material on the surface of interest, mechanically isolating the thermally compensating coupon from the surface of interest, and collecting a thermally corrected strain data set from the first strain gauge system and the second strain gauge system.

In addition to one or more of the features described above, or as an alternative, in further embodiments mounting the first strain gauge system to the surface of interest includes mounting the first strain gauge system to the surface formed from a first material and forming the thermally compensating coupon includes forming the body from a material substantially similar to the first material.

In addition to one or more of the features described above, or as an alternative, in further embodiments forming the thermally compensating coupon includes forming a first thermally compensating coupon including a first surface and a second, opposing surface and forming a second thermally compensating coupon including a first surface and an opposing second surface.

In addition to one or more of the features described above, or as an alternative, in further embodiments positioning the thermally compensating coupon on the surface of interest includes positioning a first thermally compensating coupon on the surface of interest adjacent a first portion of the first strain gauge system and positioning a second thermally compensating coupon on the surface of interest adjacent a second portion of the first strain gauge system.

In addition to one or more of the features described above, or as an alternative, in further embodiments mechanically isolating the thermally compensating coupon from the surface of interest includes mounting the thermally compensating coupon to the surface of interest with a mechanically isolating adhesive.

In addition to one or more of the features described above, or as an alternative, in further embodiments mounting the thermally compensating coupon to the surface includes adhering the thermally compensating coupon to the surface with a rubber cement.

In addition to one or more of the features described above, or as an alternative, in further embodiments collecting the thermally corrected data set includes real-time adjustment of collected date based on thermal effects realized by the second strain gauge system.

Still further disclosed is a rotary wing aircraft including a component formed from a first material having non-uniform coefficients of thermal expansion, a first sensing system mounted to the component to sense temperature and mechanical forces on the component, and at least one thermally compensating coupon mounted to the component adjacent the first sensing system. The at least one thermally compensating coupon is formed from a second material having non-uniform coefficients of thermal expansion that are substantially identical to the non-uniform coefficients of thermal expansion of the first material. A thermally compensating sensing system is mounted to the at least one thermally compensating coupon and connected to the first sensing system. The thermally compensating sensing system is isolated from the mechanical forces perceived by the component while sensing the temperatures on the component such that the connection of the thermally compensating sensing system to the first sensing system compensates for the temperature sensed by the first sensing system.

In addition to one or more of the features described above, or as an alternative, in further embodiments the first sensing system includes a first portion mounted to the component and a second portion mounted opposite the first portion, the at least one thermally compensating coupon includes a first thermally compensating coupon mounted adjacent the first portion of the first sensing system and a second thermally compensating coupon mounted adjacent the second portion of the first sensing system.

In addition to one or more of the features described above, or as an alternative, in further embodiments the first portion of the first sensing system comprises a first strain gauge and a second strain gauge, and the second portion of the first sensing system comprises a third strain gauge and a fourth strain gauge connected to form a strain gauge bridge.

In addition to one or more of the features described above, or as an alternative, in further embodiments the thermally compensating sensing system includes a first plurality of strain gauges mounted to the first thermally compensating coupon and operatively connected to the strain gauge bridge.

In addition to one or more of the features described above, or as an alternative, in further embodiments the thermally compensating sensing system includes a second plurality of strain gauges mounted to the second thermally compensating coupon and operatively connected to the strain gauge bridge.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
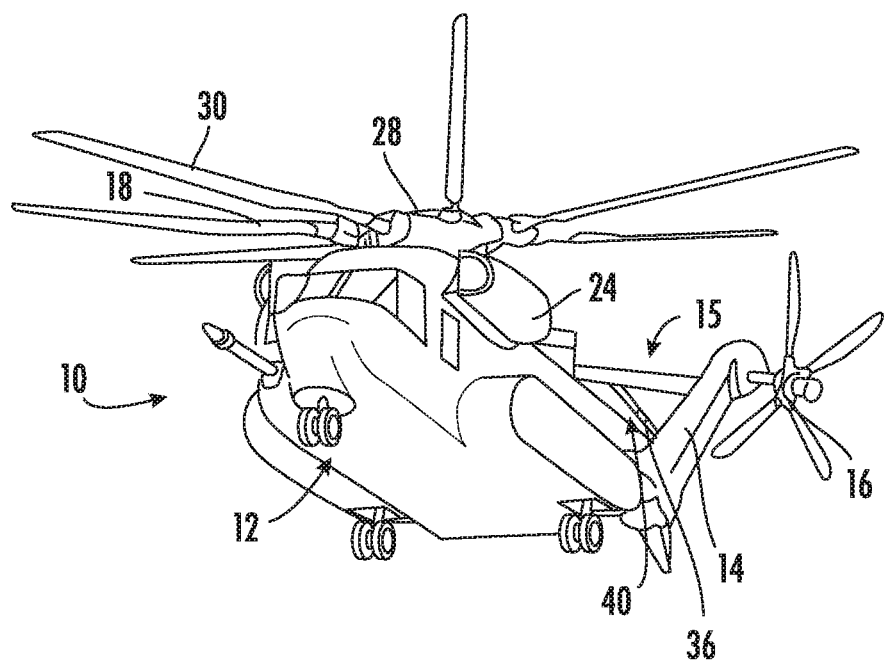
FIG. 1 depicts a rotary wing aircraft including a thermally compensated instrumentation system, in accordance with an aspect of an exemplary embodiment.

An aircraft, shown in the form of a rotary wing aircraft or helicopter is indicated generally at 10 in FIG. 1. Rotary wing aircraft 10 includes an airframe 12 having an extending tail 14 supporting a stabilizer 15 and a tail rotor 16. A main rotor assembly 18 is located at the airframe 12 and rotates about a main rotor axis "R". While the embodiment of a rotary wing aircraft 10 described herein includes an extending tail 14 having a stabilizer 15 and tail rotor 16, it is to be appreciated that the disclosure herein may be applied to other types of rotorcraft, including coaxial aircraft, contra-rotating rotorcraft, as well as other aircraft such as fixed wing and tilt wing aircraft. Further, it should be appreciated that exemplary embodiments described herein may be employed with other systems and are not limited to rotary wing aircraft or aircraft applications.

Main rotor assembly 18 is driven by a drive shaft (not shown) connected to a prime mover, for example, an engine 24. It should be understood that the number and type of prime movers employed by rotary wing aircraft 10 may vary. Main rotor assembly 18 includes a hub member 28 located at the main rotor axis. A plurality of rotor blade assemblies, one of which is indicated at 30, is connected to hub member 28. Stabilizer 15 is supported at extending tail 14 through a strut 36. In an embodiment, strut 36 supports a thermally compensated instrumentation system 40 that is operable to provide real time axial stress/strain data to an operator. That is, thermally compensated instrumentation system 40 may be connected to a data acquisition system (not shown) aboard rotary wing aircraft 10 to provide instantaneous stress/strain data from strut 36.

Figure 2A:
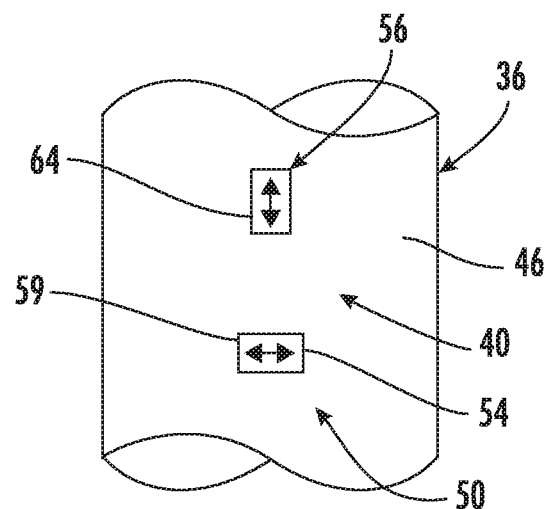
FIG. 2A depicts a first portion of a first strain gauge system of the thermally compensated instrumentation system mounted to a surface of interest of the rotary wing aircraft of FIG. 1, in accordance with an aspect of an exemplary embodiment.
Figure 2B:
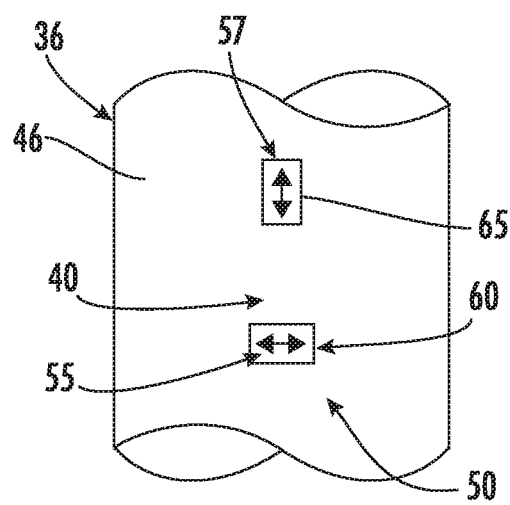
FIG. 2B depicts a second portion of the first stain gauge system mounted to the surface of interest 180° from the first portion of the system of FIG. 2A, in accordance with an aspect of an exemplary embodiment.

In accordance with an exemplary embodiment, illustrated in FIGS. 2A and 2B, strut 36 is formed from a material having non-uniform coefficients of thermal expansion such as a material formed from carbon fiber plies. While described in terms of a strut 36, it is understood that aspects of the invention can be used with any item where stress is to be measured and which is formed of a material having non-uniform coefficients of thermal expansion. Strut 36 includes an outer surface 46 that defines a surface of interest (not separately labeled). That is, it is desirable to determine stress, strain, and or other loading in strut 36 at outer surface 46. To that end, a first strain gauge system 50 of thermally compensated instrumentation system 40 is mounted to outer surface 46. First strain gauge system 50 includes a first strain gauge 54, a second strain gauge 55, a third strain gauge 56, and a fourth strain gauge 57. Second strain gauge 55 is mounted 180° from first strain gauge 54, and fourth strain gauge 57 is mounted 180° from third strain gauge 56. While described in terms of specific numbers and arrangements, it is understood that other numbers of gauges can be used in other aspects of the invention.

First strain gauge 54 may be positioned to monitor a first modulus of elasticity (Poisson) in the strut 36 and thereby define as first Poisson sensor 59. Similarly, second strain gauge 55 may be positioned to monitor a second modulus of elasticity (Poisson) in the strut 36 and thereby define a second Poisson sensor 60. Third strain gauge 56 may be positioned to sense a first axial loading in the strut 36 and thereby define a first axial sensor 64 and fourth strain gauge 57 may be positioned to measure a second axial loading in the strut 36 and thereby define a second axial sensor 65. In addition to stresses, temperature changes may affect an output of first strain gauge system 50. Canceling out temperature affects can be difficult, particularly in materials having a non-uniform coefficients of thermal expansion such as those that may be used to form the strut 36 or other components.

As will be detailed more fully herein, thermally compensated instrumentation system 40 also includes a thermal compensating portion (not separately labeled) that may be employed to strip or cancel out most thermal effects that are perceived by the first strain gauge system 50. By most, it should be understood that thermally compensated instrumentation system 40 may be configured to remove or cancel out, in real time, up to about 92% or greater of the thermal effects perceived by first strain gauge system 50.

Figure 3:
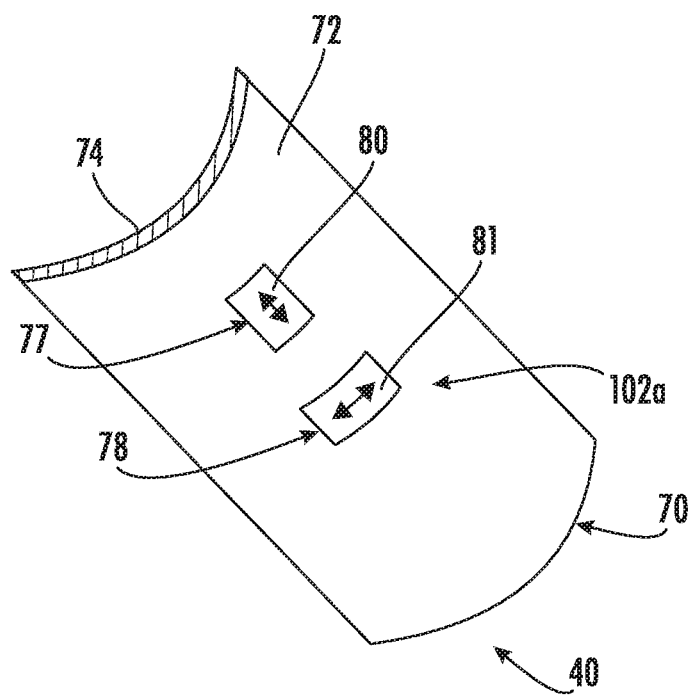
FIG. 3 depicts a first thermally compensating coupon including a first portion of a second strain gauge system of the thermally compensating instrumentation system, in accordance with an exemplary aspect.

In accordance with an aspect of an exemplary embodiment depicted in FIG. 3, the thermal compensating portion of the thermally compensated instrumentation system 40 includes a first thermally compensating coupon 70 having an outer surface 72 and an inner surface 74. In an embodiment, first thermally compensating coupon 70 is formed from substantially the same material used to form the strut 36. Further, fibers forming the first thermally compensating coupon 70 are aligned or oriented to substantially align with fibers that form the strut 36. First thermally compensating coupon 70 supports a fifth strain gauge 77 and a sixth strain gauge 78. Fifth strain gauge 77 may be positioned to sense a third axial loading in compensating coupon 70 and thereby define a third axial sensor 80. Sixth strain 78 may be positioned to monitor a third modulus of elasticity (Poisson) in compensating coupon 70 and thereby define a third Poisson sensor 81.

Figure 4:
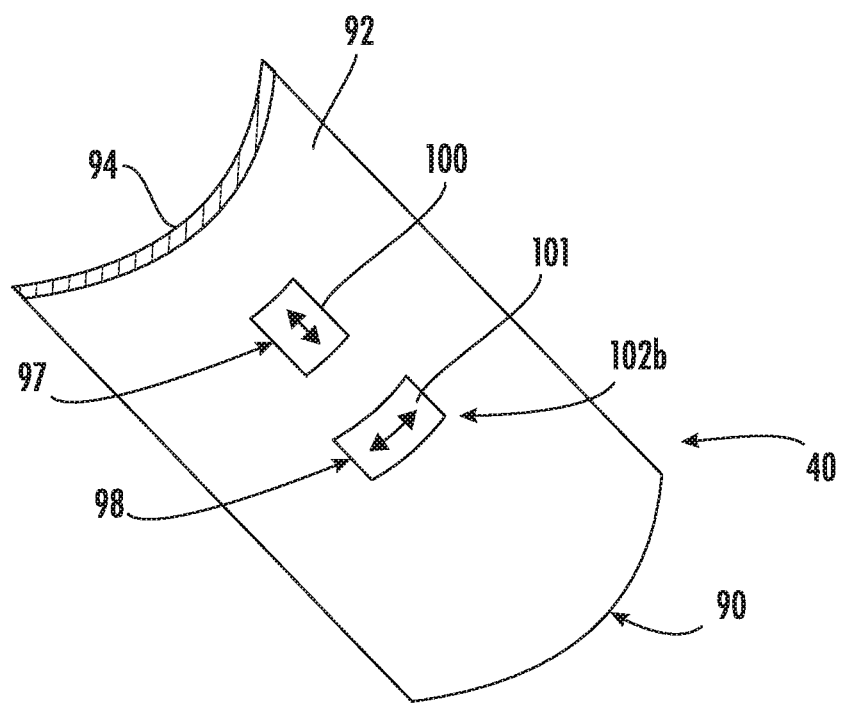
FIG. 4 depicts a second thermally compensating coupon including a second portion of the second strain gauge system, in accordance with an exemplary aspect.

In accordance with an aspect of an exemplary embodiment depicted in FIG. 4, thermally compensated instrumentation system 40 also includes a second thermally compensating coupon 90 having an outer surface 92 and an inner surface 94. In an embodiment, second thermally compensating coupon 90 is formed from substantially the same material used to form strut 36. Further, fibers forming second thermally compensating coupon 90 are aligned or oriented to substantially align with fibers that form strut 36. Second thermally compensating coupon 70 supports a seventh strain gauge 97 and an eighth strain gauge 98. Seventh strain gauge 97 may be positioned to sense a fourth axial loading in compensating coupon 90 and thereby define a fourth axial sensor 100. Eighth strain gauge 98 may be positioned to monitor a fourth modulus of elasticity (Poisson) in compensating coupon 90 and thereby define a fourth Poisson sensor 101.

Figure 5B:
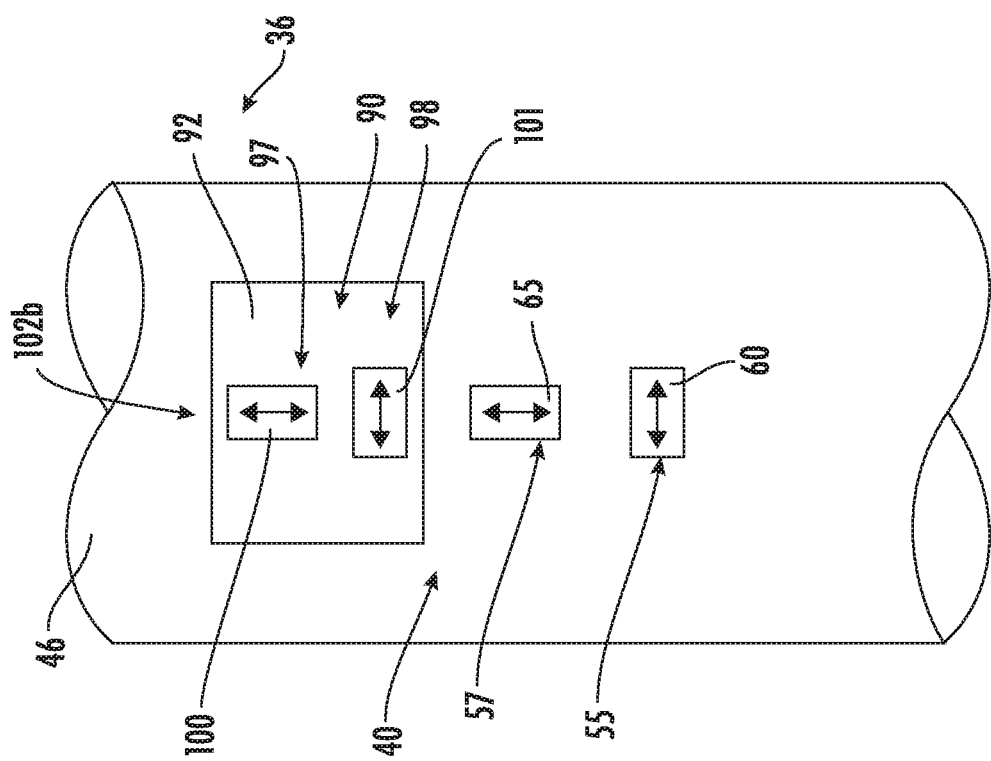
FIG. 5B depicts the second thermally compensating coupon mounted to the surface of interest adjacent to the first portion of the first strain gauge system 180° from the first thermally compensating coupon, in accordance with an exemplary aspect.
Figure 5A:
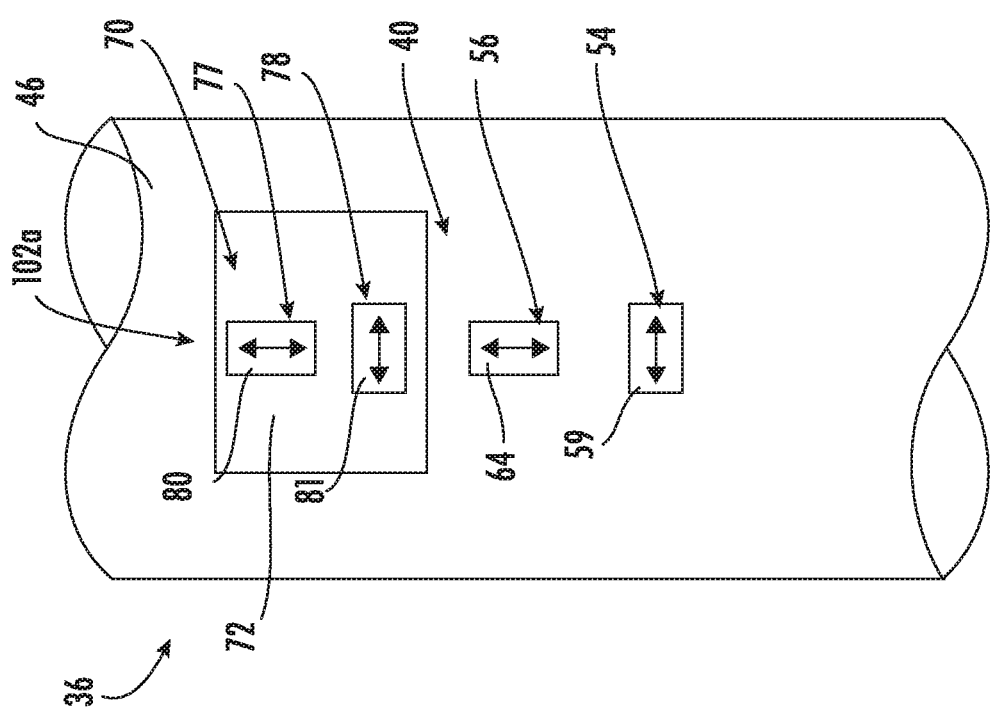
FIG. 5A depicts the first thermally compensating coupon mounted to the surface of interest adjacent to the first portion of the first strain gauge system, in accordance with an exemplary aspect.

As shown in FIG. 5, first thermally compensating coupon 70 is mounted to strut 36 on one side of the first strain gauge system 50 and second thermally compensating coupon 90 is mounted to strut 36 180 degrees apart from first thermally compensating coupon 70. In addition, third axial sensor 80 and fourth axial sensor 100 may be positioned to axially align with first axial sensor 64 and second axial sensor 65. Further, third Poisson sensor 81 may be positioned to axially align with first Poisson sensor 59 and fourth Poisson sensor 101 may be positioned to axially align with second Poisson sensor 60. With this arrangement, fifth strain gauge 77, sixth strain gauge 78, seventh strain gauge 97 and eighth strain gauge 98 form a second strain gauge system 102a and 102b.

In an embodiment, first and second thermally compensating coupons 70 and 90 are mounted to outer surface 46 of strut 36 so as to be mechanically isolated from stresses. That is, second strain gauge system 102a and 102b only perceive stress/strain associated with thermal changes in first coupon 70 and second coupon 90. Second strain gauge system 102a and 102b do not perceive any (or substantially any) mechanical stress/strain realized by strut 36.

Figure 6:
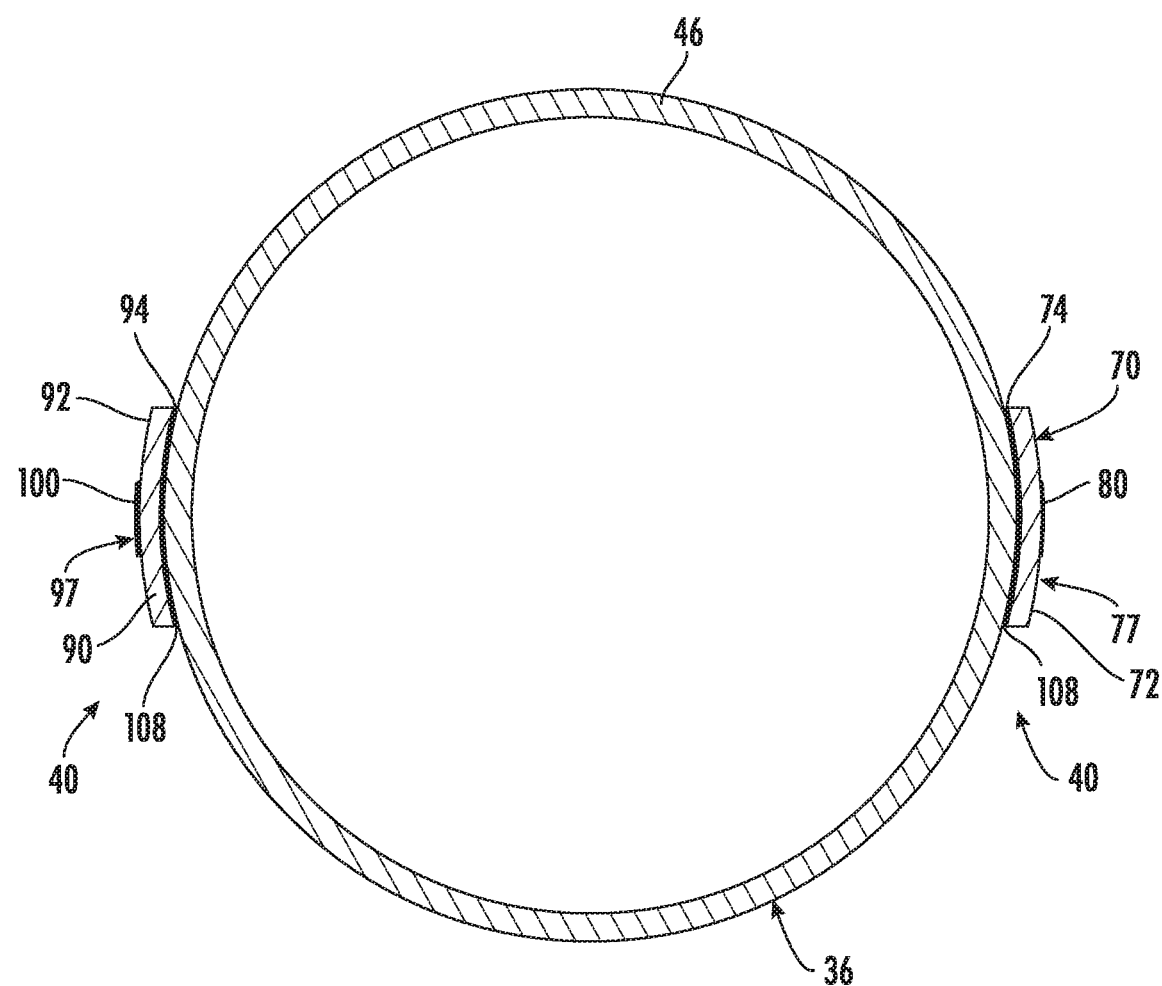
FIG. 6 depicts a cross-sectional view of the surface of interest including both thermally compensating coupons mounted, in accordance with an aspect of an exemplary embodiment.

In an embodiment illustrated in FIG. 6, first thermally compensating coupon 70 is mounted to outer surface 46 of strut 36 with a mechanically isolating adhesive 108. In an embodiment, mechanically isolating adhesive 108 may take the form of a room temperature vulcanizing (RTV) cement. In another embodiment, mechanically isolating adhesive 108 may take the form of a rubber cement. It should be understood that mechanically isolating adhesive 108 may take on a variety of forms and is designed to establish a mechanically isolating bond between first thermally compensating coupon 70 and strut 36. Mechanically isolating adhesive 108 may also include thermally conducting properties. Second thermally compensating coupon 90 is mounted to outer surface 46 of strut 36 180° from first thermally compensating coupon 70 with mechanically isolating adhesive 108.

Figure 7:
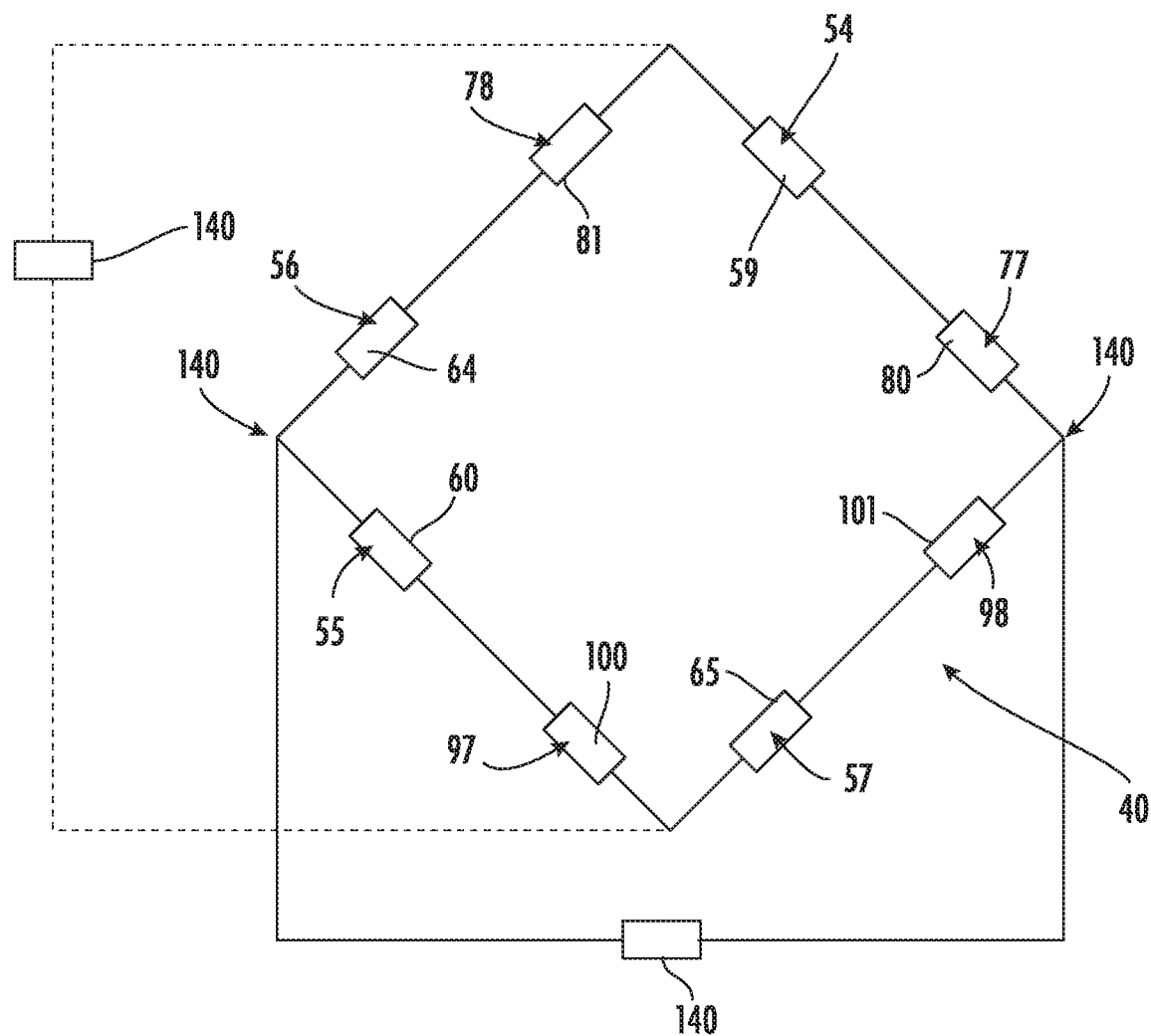
FIG. 7 depicts the thermally compensated instrumentation system as a full bridge strain gauge system including the first strain gauge system and the second strain gauge system, in accordance with an aspect of an exemplary embodiment.

Referring to FIG. 7, second strain gauge system 102a and 102b is connected to first strain gauge system 50 to form a full bridge eight (8) sensor system. The electrical outputs due to thermal effects from strain gauges 54 and 55 are approximately equal to thermally induced electrical outputs from strain gauges 78 and 98. Also the electrical outputs due to thermal effects from strain gauges 56 and 57 are approximately equal to thermally induced electrical outputs from strain gauges 77 and 97. In a Wheatstone Bridge configuration the thermally induced electrical effects of first strain gauge system 50 are effectively negated via the addition of second strain gauge system 102a and 102b. That is, thermally corrected data may be captured and evaluated in real time.

In an embodiment, electrical outputs from first strain gauge system 50 and second strain gauge system 102a, 102b may be captured by a data acquisition system 140. The test engineers and/or flight personnel may have a real time picture of thermally corrected data representing mechanically isolated stresses and strains in strut 36 formed from a material having non-uniform coefficients of thermal expansion for evaluation and/or maintenance purposes. Further, data from first strain gauge system 50 and second strain gauge system 102a, 102b may be passed to a vehicle health monitoring system such as disclosed in co-pending U.S. Patent Application No. 2017/0183107-A1 entitled "System and Method for Health Assessment of Aircraft Structure" filed on Apr. 1, 2015 incorporated herein by reference in its entirety.

In such a system, the thermally corrected data from the sensor systems 50, 102a, 102b is communicated to a health assessment module, which calculates one or more component structural condition indicators of the component. The component structural condition indicators are compiled and one or more component structural health indicators. The component structural health indicators may be compiled by aircraft zone in which case a zone structural health indicator is calculated based on the component structural health indicators of components residing in the particular aircraft zone. An aircraft level health indicator is calculated based on the component or zone structural health indicators and one or more maintenance actions are recommended based on the structural condition and health indicators.

The terms "about" and "substantially" are intended to include the degree of error associated with measurement of the particular quantity based upon the equipment available at the time of filing the application. For example, "about" and/or "substantially" can include a range of ±8% or 5%, or 2% of a given value.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A thermally compensating instrumentation system for use with a component to be measured formed from a first material having non-uniform coefficients of thermal expansion, the system comprising:
a first sensing system configured to be mounted to the component formed from the first material to sense temperature and mechanical forces on the component;
at least one thermally compensating coupon configured to be mounted to the component adjacent the first sensing system, the at least one thermally compensating coupon being formed from a second material having non-uniform coefficients of thermal expansion that are substantially identical to the non-uniform coefficients of thermal expansion of the first material; and
a thermally compensating sensing system mounted to the at least one thermally compensating coupon and connected to the first sensing system, the thermally compensating sensing system being isolated from mechanical forces perceived by the component while sensing temperatures on the component such that the connection of the thermally compensating sensing system to the first sensing system compensates for the temperature sensed by the first sensing system.

2. The thermally compensating instrumentation system according to claim 1, wherein the first sensing system includes a first portion mounted to the component and a second portion mounted opposite the first portion, the at least one thermally compensating coupon includes a first thermally compensating coupon mounted adjacent the first portion of the first sensing system and a second thermally compensating coupon mounted adjacent the second portion of the first sensing system.

3. The thermally compensating instrumentation system according to claim 2, wherein the first portion of the first sensing system comprises a first strain gauge and a second strain gauge, and the second portion of the first sensing system comprises a third strain gauge and a fourth strain gauge connected to form a strain gauge bridge.

4. The thermally compensating instrumentation system according to claim 3, wherein the thermally compensating sensing system includes a first plurality of strain gauges mounted to the first thermally compensating coupon and operatively connected to the strain gauge bridge.

5. The thermally compensating instrumentation system according to claim 4, wherein the thermally compensating sensing system includes a second plurality of strain gauges mounted to the second thermally compensating coupon and operatively connected to the strain gauge bridge.

6. The thermally compensating instrumentation system according to claim 5, wherein the first plurality of strain gauges includes a fifth strain gauge and a sixth strain gauge, and the second plurality of strain gauges includes a seventh strain gauge and an eighth strain gauge, the strain gauge bridge comprising an eighth gauge full bridge strain gauge system.

7. The thermally compensating instrumentation system according to claim 1, wherein the at least one thermally compensating coupon is connected to the component with a mechanically isolating adhesive.

8. The thermally compensating instrumentation system according to claim 7, wherein the mechanically isolating adhesive comprises one of a room temperature vulcanizing (RTV) cement and a rubber cement.

9. A method of thermally correcting data obtained from strain gauges mounted to a surface comprising:
- mounting a first strain gauge system to a surface of interest, the surface of interest comprising a first material having non-uniform coefficients of thermal expansion;
- forming a thermally compensating coupon having body including a first surface and an opposing second surface, the coupon comprising a second material having substantially the same non-uniform coefficients of thermal expansion as the first material;
- mounting a second strain gauge system to the first surface of the thermally compensating coupon;
- positioning the thermally compensating coupon on the surface of interest adjacent to the first strain gauge system such that the non-uniform coefficients of thermal expansion of the thermally compensating coupon substantially align with the non-uniform coefficients of thermal expansion of the first material on the surface of interest;
- mechanically isolating the thermally compensating coupon from the surface of interest; and
- collecting a thermally corrected strain data set from the first strain gauge system and the second strain gauge system.

10. The method of claim 9, wherein mounting the first strain gauge system to the surface of interest includes mounting the first strain gauge system to the surface formed from a first material and forming the thermally compensating coupon includes forming the body from a material substantially similar to the first material.

11. The method of claim 9, wherein forming the thermally compensating coupon includes forming a first thermally compensating coupon including a first surface and a second, opposing surface and forming a second thermally compensating coupon including a first surface and an opposing second surface.

12. The method of claim 11, wherein positioning the thermally compensating coupon on the surface of interest includes positioning a first thermally compensating coupon on the surface of interest adjacent a first portion of the first strain gauge system and positioning a second thermally compensating coupon on the surface of interest adjacent a second portion of the first strain gauge system.

13. The method of claim 9, wherein mechanically isolating the thermally compensating coupon from the surface of interest includes mounting the thermally compensating coupon to the surface of interest with a mechanically isolating adhesive.

14. The method of claim 13, wherein mounting the thermally compensating coupon to the surface includes adhering the thermally compensating coupon to the surface with a rubber cement.

15. The method of claim 9, wherein collecting the thermally corrected data set includes real-time adjustment of collected date based on thermal effects realized by the second strain gauge system.

16. A rotary wing aircraft comprising:
- a component formed from a first material having non-uniform coefficients of thermal expansion;
- a first sensing system mounted to the component to sense temperature and mechanical forces on the component;
- at least one thermally compensating coupon mounted to the component adjacent the first sensing system, the at least one thermally compensating coupon being formed from a second material having non-uniform coefficients of thermal expansion that are substantially identical to the non-uniform coefficients of thermal expansion of the first material; and
- a thermally compensating sensing system mounted to the at least one thermally compensating coupon and connected to the first sensing system, the thermally compensating sensing system being isolated from the mechanical forces perceived by the component while sensing the temperatures on the component such that the connection of the thermally compensating sensing system to the first sensing system compensates for the temperature sensed by the first sensing system.

17. The rotary wing aircraft according to claim 16, wherein the first sensing system includes a first portion mounted to the component and a second portion mounted opposite the first portion, the at least one thermally compensating coupon includes a first thermally compensating coupon mounted adjacent the first portion of the first sensing system and a second thermally compensating coupon mounted adjacent the second portion of the first sensing system.

18. The rotary wing aircraft according to claim 17, wherein the first portion of the first sensing system comprises a first strain gauge and a second strain gauge, and the second portion of the first sensing system comprises a third strain gauge and a fourth strain gauge connected to form a strain gauge bridge.

19. The rotary wing aircraft according to claim 18, wherein the thermally compensating sensing system includes a first plurality of strain gauges mounted to the first thermally compensating coupon and operatively connected to the strain gauge bridge.

20. The rotary wing aircraft according to claim 19, wherein the thermally compensating sensing system includes a second plurality of strain gauges mounted to the second thermally compensating coupon and operatively connected to the strain gauge bridge.

* * * * *